J. B. GREENHUT,

2 Sheets—Sheet 1.

Assignor, by mesne assignments, to McCORMICK HARVESTING MACHINE CO.

Grain Binder.

No. 9,670. Reissued April 19, 1881.

Attest:
H. L. Perrine
Daniel Kelly.

Inventor:
Joseph B. Greenhut
By Parkinson & Parkinson
Attorneys

THE NORRIS PETERS CO., PHOTO-LITHO., WASHINGTON, D. C.

2 Sheets—Sheet 2.
J. B. GREENHUT,
Assignor, by mesne assignments, to McCormick Harvesting Machine Co.
Grain Binder.
No. 9,670. Reissued April 19, 1881.
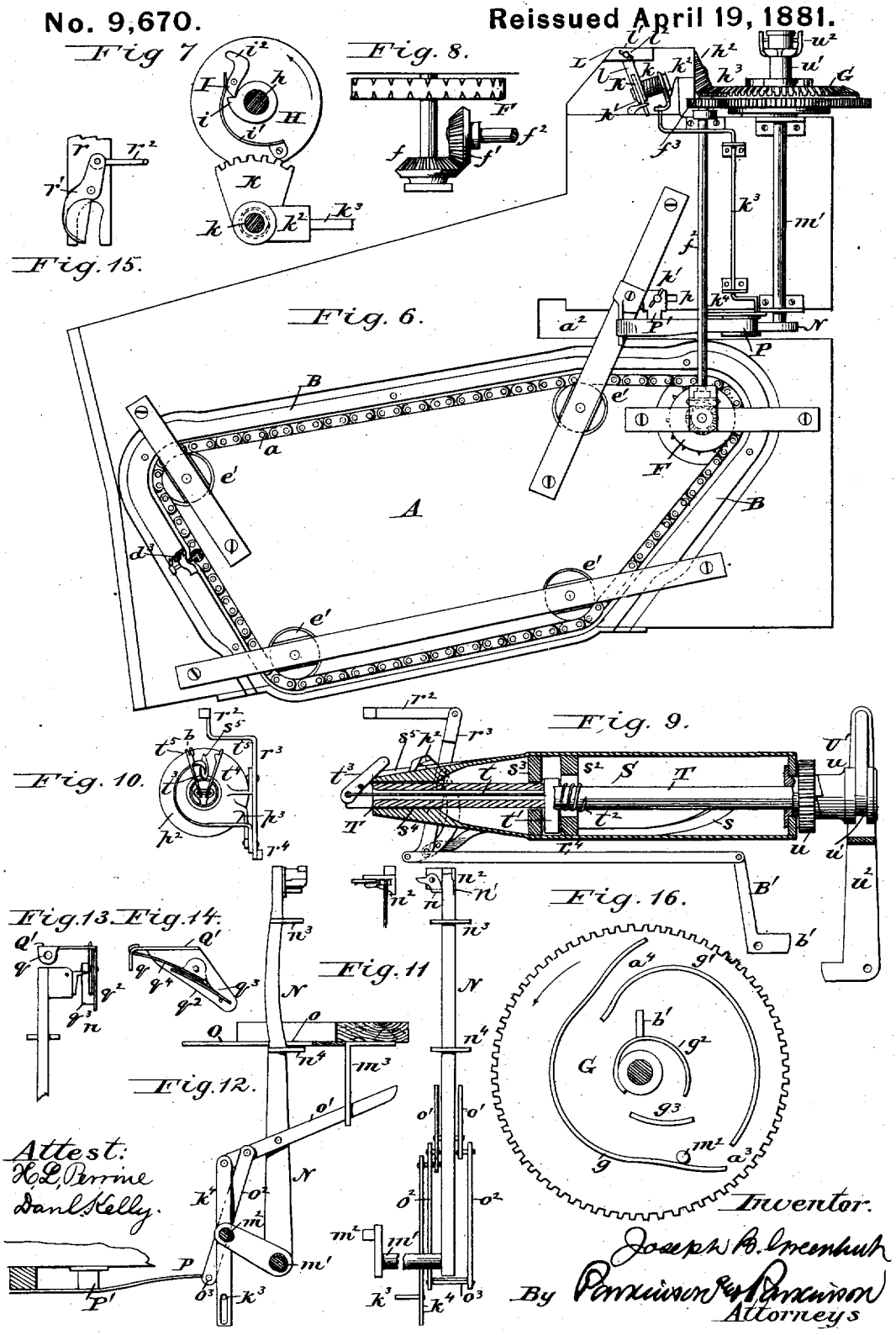
THE NORRIS PETERS CO., PHOTO-LITHO., WASHINGTON,

UNITED STATES PATENT OFFICE.

JOSEPH B. GREENHUT, OF PEORIA, ASSIGNOR, BY MESNE ASSIGNMENTS, TO McCORMICK HARVESTING MACHINE COMPANY, OF CHICAGO, ILL.

GRAIN-BINDER.

SPECIFICATION forming part of Reissued Letters Patent No. 9,670, dated April 19, 1881.

Original No. 81,891, dated September 8, 1868. Application for reissue filed October 26, 1880.

*To all whom it may concern:*

Be it known that I, JOSEPH B. GREENHUT, formerly of Chicago, in the county of Cook and State of Illinois, but now of the city and county of Peoria, in said State, have invented certain new and useful Improvements in Grain Harvesting and Binding Machines, of which the following is a specification.

My invention relates partly to the harvester and partly to mechanism for automatically binding the cut and gathered grain; and it consists in a rake secured to, and operated by, an endless chain placed in a slot made in the platform of the reaper, combined with an automatically-tripped locking device which holds it in position during a portion of its journey, and releases it, allows it to swing upon its vertical axis, and locks it in a fresh position during another portion; in the combination, with the binding-arm, of an opposing compressor, jointed thereto at a point along its length, so as to be carried therewith in its sweep, and controlled in such manner as to be actuated by the movement of said binding-arm; in a novel regulating device so constructed and arranged that when the grain is sparse the rake and binding machinery may be operated only at sufficient intervals to gather and bind a full-sized sheaf; in improved knotting devices whereby the ends of the band are tied in a bow-knot after having been passed around the sheaf; in a stripping arm or finger independent of the knotter and arranged to sweep the looping-surface of the latter after the knot has been laid to push off and tighten the loop; in combining with the knotter and with the cutter a single gear and cam wheel, whereby the rotary and endwise motion is given to the parts of the knotter and the cutter actuated to sever the cord, and in the various combinations and details of construction hereinafter described and claimed.

Figure 1:
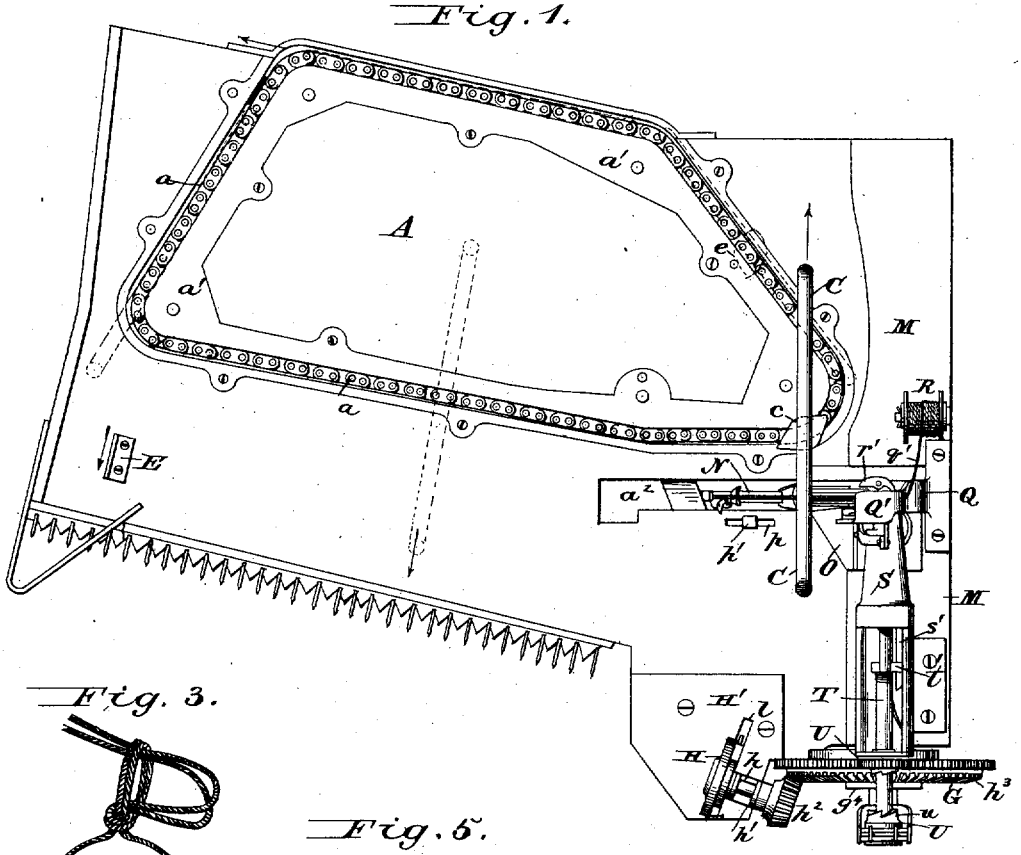
Figure 3:
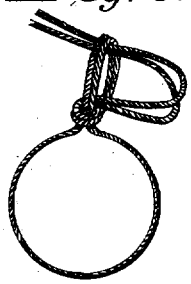
Figure 5:
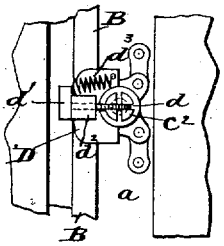
Figure 2:
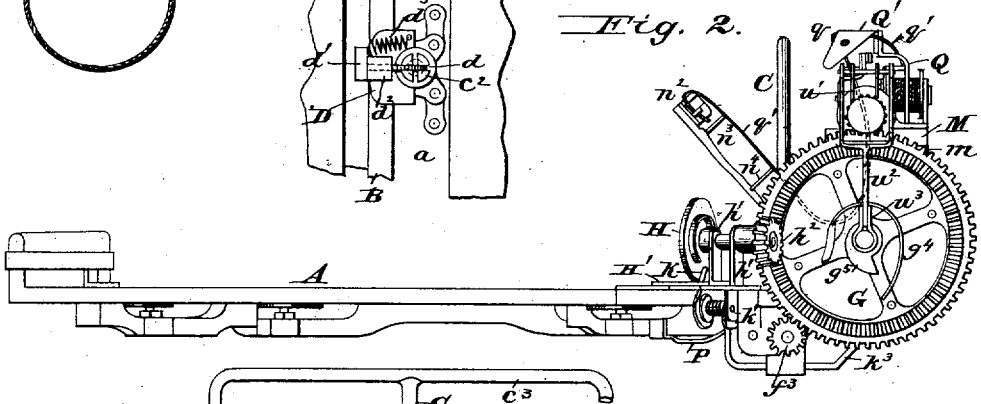
Figure 4:
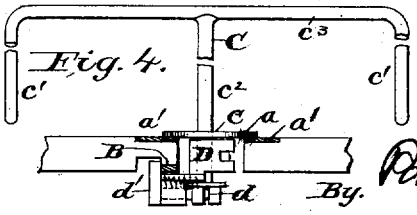

In the drawings, Figure 1 is a top-plan view of a machine embodying my invention; Fig. 2, a front elevation of the same; Fig. 3, a detail of the band formed by the binding mechanism; Fig, 4, a detail of the rake and its operating devices; Fig. 5, a bottom-plan view of the devices shown in Fig. 4; Fig. 6, a bottom-plan view of the grain-platform and binding machinery; Fig. 7, a side elevation of the driving-pulley and regulating-segment whereby the intervals of operation are determined; Fig. 8, a detail representing the sheave or sprocket wheel and bevel-gear whereby the endless rake-chain is driven; Fig. 9, a side elevation, partly in section, of a knotter and a portion of the devices for operating it and the knife; Fig. 10, an end view of the same. Fig. 11 is a plan view, and Fig. 12 a side elevation, of the band-carrying arm and compressing mechanism; Fig. 13, a front, and Fig. 14 a side, elevation of the tripping device for releasing the old end of the cord from the band-carrying arm and delivering the new end thereto; Fig. 15, a plan of the knife which severs the band from the spool portion of the cord, and Fig. 16, an elevation from the side opposite to that in Fig. 2 of the gear and cam-wheel whereby the rake is driven and the binding-arm and knotting and cutting devices is actuated.

A is a grain-platform attached to the reaper, and so far differing from the ordinary platform as to afford a support for the binding mechanism. Through this platform is formed a continuous slot, *a*, which in front runs parallel, or nearly parallel, with, but some distance back from the cutter-bar until it reaches the binding devices at the stubble side of the machine; then makes a sharp turn and retreats obliquely toward the grain side until it reaches the rear of the platform, where it again becomes essentially parallel with the cutter-bar, and finally, near the grain-board, returns obliquely and outwardly to its starting-point just back of the divider.

Beneath the platform and along the outer side of the slot therein is placed a guide-rail, B, of varying thickness, being uniform where the rake is to go steadily in one position, as along the front and rear of the platform, and increasing at the bends of the slot and along its shorter lines, to regulate the position of the rake as it moves around. At the top the edge of the slot is guarded by metal plates $a'$ $a'$, as shown, which form a seat and track way for the foot-plate *c* of the rake C. This rake consists of three or more (if desirable) teeth or bars, $c'$ $c^2$, secured to a cross bar or head, $c^3$, the central bar being provided with the foot, which is of lozenge form, and slides, as above stated, upon the face of the metal plates $a'$ $a'$ on the top of the platform. Beneath the foot-plate and within the slot in the platform is a block, D, to which the chain is attached. The central bar, $c^2$, is prolonged, to pass freely through the block, and at its lower end has two grooves or mortises crossing each other, into which enters the shank $d$ of the guiding-hood $d'$. This hook rests and moves in the loop or way $d^2$, depending from the block D, and is held inward against the flange and to lock the rake in position by the coiled spring $d^3$, fastened to said hook and to the block. It keeps the rake firmly in place when its shank is within either of the mortises, but allows it to swing around or revolve when the shank is withdrawn therefrom against the stress of the spring by any of the swells in the guide-rail, thus permitting the rake to assume different positions as it moves around the platform.

A pin, $e$, and guide E secured to the top of the platform govern, in conjunction with the foot-plate and guide-hook, the movements of the rake, which stands across the slot and at right angles to the cutter-bar when it rakes the grain and delivers it to the binding mechanism, after which it is unlocked by the withdrawal of the shank of the guide-hook and moves sidewise until the foot-plate strikes the pin $e$, when it takes position in the direction of the slot, and is again locked and moves on toward the grain side of the machine. As it reaches the grain-board and turns toward the front of the machine the guide-hook is a second time withdrawn by a swell in the guide-rail and the rake unlocked, when the front tooth of the rake immediately after comes in contact with the guide E, and rides along its face while the block is reaching and turning into the straight portion of the groove behind the cutter-bar. The tooth then rides off of the guide, and the rake is again locked and moves across the platform to gather a fresh gavel.

The endless chain which drives the rake is supported by flanged pulleys $e'$ $e'$ and moved by the toothed sheave or sprocket wheel F, which, in its turn, is driven by the bevel-gear $f$ $f'$, shaft $f^2$, and pinion $f^3$, the last gearing into the gear and cam wheel G.

The pulley H, being the driving-pulley of the whole binding machinery, is connected directly with the driving-wheel of the reaper, to which the platform is attached by a chain, belt, or some other connecting device, and its shaft $h$, which is supported by and journaled in the standard $h'$ upon the plate H', bears a bevel-pinion, $h^2$, gearing into the bevel-gear $h^3$, secured to or cast in one piece with the gear-wheel G. The driving-pulley is caused to run fast or loose upon its shaft and to operate the raking and binding mechanism at longer or shorter intervals by means substantially as follows: The shaft $h$ is formed with a shoulder, $i$, against which catches a pawl, I, pivoted to the side of the pulley and pressed toward the shaft by the spring $i'$. The heel end $i^2$ of the pawl is hooked, so that as the pulley revolves it may gear into the toothed segment K when the latter is in position. This segment is set upon the shaft $k$, supported beneath the grain-platform in hangers $k'$ $k'$, and projects up through a slot, $l$, in said platform and in the plate H', so that it may be rocked to or from the pulley. At the end of the shaft, away from the segment, is mounted a bent and slotted plate, $k^2$, into the slot of which enters one cranked end of the rod $k^3$, the other cranked end of the rod being placed in the slotted end of the connecting-link, $k^4$, pivoted to the heel end of one of the compressing-arms, as hereinafter described, so that the segment may be thrown into position for action by the descent of the binding-arm to receive a fresh gavel.

Across the slot in plate H', through which passes the segment, is placed a regulating-plate, L, adjustable in and out to determine the point at which the segment shall stop when it is swung into the range of the pawl. In the construction shown the regulating-plate is slotted, as at $l'$, and through this slot passes a set-screw, $l^2$, whereby it is held to the bed-plate H' and may be loosened and moved relatively to the bed-plate, and then clamped again in the desired adjustment; but it may be pivoted to the bed-plate, and with proper connections may be placed under the control of the attendant, so as to be adjustable at will while the machinery is in operation.

When grain is sparse, by observing how many revolutions the driver of the reaper has to make in order to cut sufficient for a sheaf, the number of these during which the rake and binder should remain idle, may be calculated, and the regulating-plate will be so adjusted that as the segment is thrown out by the descent of the binding-arm it will be stopped at a point bringing a corresponding number of its teeth under the action of the pawl, and then as the pulley revolves the heel end of the pawl engages at each revolution with a single tooth of the segment, moving it back a distance equal to that tooth, and being itself depressed in meeting and passing the segment so as to lift the nose of the pawl and prevent its engagement with the shoulder upon the driving-shaft. This action is repeated at each revolution until the segment has been moved back, tooth by tooth, out of the way of the pawl, which then engages with the shaft and starts the raking and binding machinery. At the conclusion of the binding operation the binding-arm will fall to receive a fresh gavel, and the segment will be again thrown out against the regulating-plate in position to disengage the driving-pulley from its shaft for the ensuing quota of revolutions until sufficient for a new sheaf has been cut.

When grain is heavy, so that no interval of means of a link, $r^4$, connected with the longer arm of a cranked lever B′, the shorter arm or heel $b'$ of which is engaged by cam-flanges $g^2$ $g^3$ on the inner face of the gear-wheel G, as in Fig. 16. The cam-flange $g^2$ serves to raise the heel to throw the knife open and admit the cord between the prongs, and the cam-flange $g^3$ to depress it to close the knife and sever the cord, and they are so related to the cam-flanges $g$ and $g'$, which operate the binder-arm, that the knife is actuated to sever the cord just before the binder-arm falls, while during the fall and for some time after the arm is raised the knife is open that the cord may be properly laid between the prongs.

The device for forming the knot in the ends of the band after it has been passed about the gavel is as follows:

A conico-cylindrical case, S, is secured to the bench M and provided in its cylindrical part with internal grooves, $s$ $s'$, formed by flanges, and with transverse partitions $s^2$ $s^3$, the first of which is slotted to admit the grooves. At the forward end the conical part is enlarged or thickened inwardly to leave a cylindrical aperture, $s^4$, and externally has a longitudinal indentation or slot, $s^5$, into which enters the hooked end of a bent arm or lever, $p^2$, having its fulcrum at the end of the brace $p^3$, secured to the case, and its short end pinned to and moved by the lower part of the lever $r^3$ in the train which moves the knife. The groove $s$, after leaving the partition $s^2$, runs back longitudinally of the case for a portion of its length, and then curves gradually until it has passed quarter around its internal periphery, when it meets and enters the groove $s'$, which returns in a straight line parallel with the axis of the tube or case until it reaches and re-enters the partition at an angle of forty-five degrees from the point where the other leaves it. Axially through the case and aperture $s^4$ is passed a shaft, T, which, at its forward end, is tubular to admit a rod, $t$, and nearly midway of its length has a longitudinal slot for the reception of a key, $t'$, attached to said rod and taking into the grooves in the casing. This key is pressed constantly forward by means of a spring, $t^2$, coiled about and at one end secured to the shaft. The space between the partitions $s^2$ and $s^3$ is such that the key-piece may fit easily and turn therein as the shaft revolves, but will be prevented from movement endwise of the case, except when it reaches a slot connecting with one of the grooves.

At the forward end of the shaft are pivoted fingers $t^3$ $t^4$, and above the pivot the shaft has two slits flaring outwardly from this common point in the shape of a V, so that as the fingers are thrown back they will enter the slits and be separated, but when brought down again parallel with the shaft will come against and into close contact with each other. The heel ends of these fingers are formed into a loop whereby they are jointed to the end of the rod $t$. They are tapered toward the outer end and are there provided with small heads $t^5$, which face each other, and one of which is recessed and the other shouldered, so that when the fingers come together they may shut into each other and form a tight joint, past which the twine cannot escape, while between them and the pivot the fingers will be lifted from contact, leaving a space in which the twine is free. One of the heads $t^5$ has a longitudinal slit which, when the fingers are being drawn into the case, comes into line with the groove $s^5$ in the conical end of the casing, and is swept by the point of the bent arm $p^2$ as it moves forward to push the loop off of the knot and run it down upon the cord to the plate in order to tighten it close to the sheaf.

The rear end of the shaft T is provided with a pinion, U, running loosely thereon, and gearing into the peripheral teeth of the wheel G. Beyond the pinion the shaft has a head, U′, provided with a clutch-half, $u$, arranged to lock into a corresponding clutch-face on the pinion. The head is placed in the yoke $u'$ at the upper end of the forked standard or cranked lever-arm, $u^2$, pivoted to a collar, $u^3$, on the shaft of the gear and cam wheel. The short arm or heel of this lever is acted upon by a cam-flange, $g^4$, and cam-block $g^5$, cast with or secured to the face of the wheel, as represented in Fig. 2, the flange pressing the heel down, so as to project the shaft T through the knotting-case and clutch it to its pinion, and the block pressing the heel up to retract the shaft and unclutch it from its pinion.

When the shaft is in its retracted and unclutched position the key $t'$ rests at the junction of the grooves $s$ $s'$, and the fingers are partly open and pointing forward within the conical chamber in the front portion of the casing. As it is projected the key follows the straight grooves $s'$ until it enters into the space between the partitions, and the fingers are brought together by the converging sides of the chamber and held closed against the stress of the spring $t^2$ until they have passed through the tubular aperture, when the spring forces out the rod $t$ and throws them back. The key and fingers are at this moment, it will be remembered, forty-five degrees in advance of the position shown in Fig. 9, and the fingers are therefore laid back on the left-hand side of the conical portion of the casing, so as to shut over the strands of cord which have been brought against the casing at that side by the action of the binding-arm, and inclose said strands between themselves and the casing. At the same moment the shaft has become clutched to its pinions and begins to revolve, turning to the left. The fingers come against that portion of the cord stretching toward the gavel and push it before them until it is bent over their outer inclined faces and slides off therefrom upon the strands stretching toward the holder and cutter above, thus twisting the strands across each other and forming the loop. The shaft has now made three-fourths of a revorest is necessary, the regulating-plate will be set to stop the segment short of the path of the pawl, and the pulley will therefore run fast with its shaft throughout every revolution.

The gear-wheel G is journaled in the standard $m$ of the bench M bearing the knotting device, and its inner side, or the side nearest to the said standard, is provided with cam-flanges $g\,g'$, of the shape represented in Fig. 16.

A rock-shaft, $m'$, supported in suitable bearings, is secured firmly at one end to the heel of the binding or band-carrying arm N, and at the other end is provided with a crank, the wrist-pin $m^2$ of which, as the gear-wheel revolves, follows the cam-flanges $g\,g'$ and raises or lowers the binding-arm and holds it fast in position. The cam-flange $g$ flares outwardly toward the periphery of the wheel at each end, while its main portion is concentric with the axis thereof. It receives the wrist-pin at the end $a^3$, and as the pin travels up the incline at this end the binding-arm is raised. As the pin reaches the concentric portion the binding-arm reaches the limit of its upward stroke, and is held in that position until the pin has traveled over said portion and reached the incline $a^4$ at the other end of the flange, when it recedes with the descent of the pin. The cam-flange $g'$ commences at the point where the end $a^4$ of the flange $g$ begins to flare outwardly, and runs parallel with this end for a short distance, until it has forced the wrist-pin and binding-arm to the limit of their return movement, then becomes concentric with the axis of the wheel, to hold the wrist-pin and binding-arm down, and finally terminates near the end $a^3$ of flange $g$, to deliver the pin to the latter for the next upward movement. At its nose the binding-arm is provided with a little cam or dog, $n$, the edge of which presses the end of the twine against the notched vertical flange $n'$ and holds it fast. Above the cam is also placed a hook, $n^2$, over and under which the end of the twine passes after leaving the cam. The binding-arm has also two projecting lugs, $n^3$ $n^4$, the former of which supports the twine just beneath the nose and guides it to the cutting-knife, and the latter of which also supports the twine close to the gavel as it is compressed, and shuts in beneath and guides it into the slot $o$ of the plate O. These two lugs also serve to lift the strands of cord away from the body of the binding-arm, to give space for, and properly present them to, the action of the knotter, which takes place at a point between said lugs.

Compressing-arms $o'$ $o'$ are pivoted to the binding-arm, and are controlled at their heel ends, eccentrically to the axis of the latter, by means of links $o^2$ $o^2$, which are knee-jointed thereto, and at their lower ends jointed, by a pin, $o^3$, to one end of a strong arm, P, the other end of said arm being secured to the grain-platform. By this construction the compressing-arms are actuated by the movement of the binding-arm to close toward or open away therefrom as one, to compress the gavel or receive the next.

A movable block, P′, made adjustable by means of a slot, $p$, in the platform, and a bolt and nut, $p'$, working in connection therewith, affords a fulcrum for the spring-arm, and by shifting this fulcrum out or in the compressing-arms will be adjusted relatively to the binding-arm, and the force of compression will be increased or decreased, as desired. The heel of one of the compressing-arms is prolonged beyond its joint with the link $o^2$, to afford a pivot-bearing for the connecting-rod $k$, by which the regulating-segment is set for action.

When the binding-arm is down it lies in the slot $a^2$ of the platform, and the compressing-arms are opened back away therefrom and lie nearly parallel therewith, pointing to the stubble side of the machine, so that there is no interference with the raking of the grain. After the grain has been gathered into a gavel by the rake and deposited over the binding-arm the latter rises, carrying the gavel before it, the compressing-arms gradually close, and the gavel is compressed, with a force determined by the adjustment of the spring, between said binding and compressing arms and against the guides $m^3$, depending from the bench M, into which the ends of said compressing-arms take, and the plate O, also secured to the bench and slotted at $o$, as above stated, to receive the binding-arm and cord. As the binding-arm returns, after the sheaf is bound, the compressing-arms again open away therefrom until they reach their former position parallel therewith, and it comes to a stop for the reception of the next gavel.

Q is a standard secured to the bench M and bearing a cap, Q′, in which is formed a guide eye or opening, $q$, for the twine $q'$ passing from spool or bobbin R down through said opening and to the nose of the binding-arm, where its end is secured by the dog or cam, as above described. The cap is provided with a flange, $q^2$, to which a pawl or switch, $q^3$, is pivoted, and a spring, $q^4$, serves to press this switch into its normal position. When the binding-arm rises the projecting arm of its cam $n$ passes over and beyond the switch, whereby the cam is opened and the old end of the twine disengaged. On the retrograde movement of the binding-arm this projecting arm of the cam, which has now received the new end of the twine, passes underneath the switch without being tripped.

Secured to the standard Q is also a horizontal plate, $r$, which has its forward end formed in the shape of a fork, to one prong of which the knife $r'$ is pivoted, while the other prong is made like a shear-blade with a cutting-edge, against which the knife acts. From the shank of the knife, beyond its pivot, a link or connecting-rod, $r^2$, leads to the upper end of a lever, $r^3$, pivoted to the casing of the knotter. The lower arm of this lever is, by lution, bringing the key opposite the slot in partition $s^2$, which leads to the groove $s$, as represented in Fig. 9, and the cam-block acts to unclutch and retract it. In its movement back the fingers are brought against the walls of the casing and are closed down, one on each side of the strands of cord running from the just-formed loop vertically up in front of them toward the point of the binding-arm, so as to seize said strands and draw them through the loop as they recede within the case. At the same time the cord is cut and the bent arm $p^2$ is moved down so as to push the loop off of the casing and fingers and down toward the sheaf, tightening it and holding it while the fingers are receding. When the fingers have reached the widened portion of the case in front of the partition $s^2$ they are opened by the action of their spring and release the looped ends of the knot. In this backward movement or recession of the shaft the key $t'$ follows the curved groove $s$, thus giving the lacking quarter-turn and completing a full revolution, so that in the next operation the shaft and fingers may start from their original position. If the full revolution were given by the pinion the fingers, after completing the loop, would be carried past the upper ends of the cord stretching vertically in front of them, so that without extra appliances for the purpose these ends would not be seized when the fingers closed.

In order to operate the machine the end of the twine is drawn from the full spool, passed through the guide-eye in the cap Q′, between the prongs of the cutter, over the hook at the point of the binding-arm, and under the dog, by which it is clamped and secured. The machine is then started, and after a sufficient interval the rake is thrown into gear and travels along the front of the platform, gathering the grain lying thereon and delivering it to the binding-arm, which rises, compresses, and encircles the sheaf, as above described, and brings the end of the twine held by it between the prongs of the cutter and against the strand running from the gavel to the spool. The knotter next comes into action, and grasping the doubled strands forms a loop and draws the ends therethrough, immediately following which the hooked arm $p^2$ and cutter are simultaneously operated to draw down and tighten the loop and sever the gavel portion of the twine from the spool portion. Finally the band is released by the knotter, the binding-arm recedes, carrying with it the new end of the twine, and the sheaf is released and allowed to drop.

I claim as my invention—

1. The combination of the rake, the endless chain by which it is driven, a locking device to hold said rake in position, and means whereby the rake is unlocked and swung upon its vertical axis as it travels and locked again in a fresh position.

2. The combination of the rake, the endless chain by which it is driven, the spring-pressed hook or bolt taking into slots in the shank or axial standard of the rake, the guide or cam rail beneath the grain-platform by which said hook or bolt is alternately withdrawn and allowed to be projected, and the pin and guide-plate placed in the path of said rake whereby it is swung from one position to another when unlocked.

3. The combination, with the binding-arm, of a compressor jointed thereto at a point along the length of said binding-arm, so as to be carried therewith in its sweep, and means whereby it is actuated by the movement of the binding-arm to close in toward or open away therefrom to compress the gavel or receive a new one.

4. The combination of the binding-arm and an opposing compressor jointed thereto, and means for adjusting the compressor relatively to the binding-arm.

5. The combination, with the binding-arm, of a compressor jointed thereto, so as to be carried therewith in its sweep, and controlled at its heel end eccentrically to the pivot of said binding-arm, so as to be actuated by the movement of the latter.

6. The combination, with the binding-arm, of compressing-arms jointed thereto, links pivoted to the heels of said compressing-arms, and an arm pivoted to said links to cause the compressing-arms to close toward and open away from the binding-arm with the movement of the latter.

7. The combination, with the binding-arm, of compressing-arms jointed thereto, links pivoted to the heels of said compressing-arms, an arm pivoted to the links to cause the compressing-arms to close and open with the movement of the binding-arm, and means for adjusting the arm to which said links are pivoted to adjust the compressing-arms relatively to the binding-arm.

8. The combination, with the binding-arm, of an elastically-yielding compressor, and means whereby the force of its resistance can be adjusted to compensate for gavels of different sizes or compact them to a greater or less extent.

9. The combination, with the binding-arm, of an elastically-yielding compressor, a spring against the stress of which it yields, and means for increasing or decreasing the stress of said spring.

10. The combination, with the binding-arm, of the compressing-arms jointed thereto, links pivoted to the heels of said compressing-arms, and a spring connected with said links, whereby the compressing-arms are actuated by the movement of the binding-arm and compress the gavel with a yielding force.

11. The combination, with the binding-arm, of the compressing-arms jointed thereto, links pivoted to the heels of the compressing-arms, a spring connected with said links, and means for adjusting the stress of the spring whereby the compressing-arms are actuated by the movement of the binding-arm and compress the gavel with a yielding and variable force.

12. The combination, with the binding-arm, of the compressing-arms jointed thereto, links pivoted to the heels of the compressing-arms, a spring-arm pivoted to the links at one end and at the other secured to the frame-work, and a block serving as a fulcrum for said arm, adjustable out and in to vary the force with which it acts.

13. In a cord-knotter, the combination, with the tube about the end of which the loop is formed, of fingers arranged and actuated to be thrown back from the extreme end of the tube into an inclined position over the strands of cord laid against its side and to rotate about its axis, whereby the loop is wound and the band portions deflected over the sloping outer surface of the fingers to cross the end portions.

14. In a cord-knotter, the combination of a tube upon the end of which the loop is formed, an intermittingly-revolving shaft reciprocating through said tube, fingers pivoted to the end of the shaft, and a rod passing through the forward part of the shaft and pivoted to the fingers to throw them back over the strands of cord stretched past the side of the tube as the shaft is projected.

15. In a cord-knotter, the combination of a tube upon the end of which the loop is formed, an intermittently-revolving shaft reciprocating through said tube, and fingers pivoted to the end of the shaft and actuated, as it is projected, to fold back over the strands of cord stretched past the side of the tube in order to form the loop during the ensuing revolution of the shaft, and to close as it is retracted to catch the ends and draw them through said loop.

16. In a cord-knotter, the combination of a tube upon the end of which the loop is formed, an intermittently-revolving shaft reciprocating therethrough, and fingers pivoted to the end of said shaft in such relation that they may be closed as the shaft is retracted by contact with the internal walls of the aperture through which said shaft plays at the end of the tube.

17. In a cord-knotter, the combination of a tube upon the end of which the loop is formed, an intermittently-revolving shaft reciprocating therethrough, fingers pivoted to the end of the shaft so as to be closed as it is withdrawn by contact with the internal walls of the aperture through which it moves, and a spring-pressed rod playing in said shaft and pivoted to the fingers to force them open as the shaft is projected.

18. The combination, with the fingers by which the ends of the band are drawn through the loop, of inwardly-projecting heads or stops upon the ends of said fingers, which come together as the fingers are closed and prevent the escape of the folded ends of the cord, while leaving a space between their body portions in which the cord is free.

19. The combination of the tube upon which the loop is formed, the intermittently-rotating shaft reciprocating within said tube, fingers at the end of said shaft operating to form the loop and seize the ends of the cord and draw them therethrough, a gear-wheel whereby the shaft is rotated, and cams upon the face of said wheel to impart the endwise motion to the shaft.

20. In combination with a knotter, an independent stripper, by which the looping-surface of the knotter is swept, after the knot has been laid, to push the loop off.

21. In combination with a knotter, and with a binding-arm delivering the cord thereto, an independent stripper by which the knotter is swept, after the knot has been laid, to push the loop off the looping-surface.

22. In a cord-knotter, the combination, with the tube upon the end of which the loop is formed, of a stripper-arm actuated, after the knot has been laid, to sweep the tube longitudinally at said end.

23. In combination with the tube upon the end of which the loop is formed, a stripper-arm, the point of which sweeps a longitudinal surface-slot in said end to remove the loop therefrom after the ends of the cord have been seized and drawn through.

24. In combination with the tube upon the end of which the loop is formed, a stripping and tightening arm, the point of which sweeps a longitudinal surface-slot in said end to remove the loop therefrom and run it up against the sheaf after the ends of the cord have been seized and drawn through.

25. In combination with the tube upon the end of which the loop is formed, and with the fingers by which the ends of the cords are seized and drawn through said loop, a stripper-arm, the point of which sweeps a longitudinal surface-slot in the end of the tube and a slot in the end of one of said fingers, to effectively strip and tighten the loop.

26. In a tubular cord-knotter, the combination, with the rotating portion by which the loop is laid, of a pinion running loose thereon and provided with a clutch-face, and a fast clutch-half engaging with said face and thrown out of engagement by the endwise movement to draw the ends of the cord through the loop.

27. The combination of the tube upon the end of which the loop is formed, the intermittently-rotating shaft reciprocating within said tube, a pinion running loose upon the shaft and gearing with suitable driving mechanism, and a clutch fast to the shaft whereby the pinion is alternately engaged and disengaged by the reciprocation of the shaft.

28. The combination of the tube upon the end of which the loop is formed, the intermittently-rotating shaft reciprocating within said tube, a pinion running loose upon the shaft, a clutch fast to the shaft, and a gear and cam wheel provided with a series of gear-teeth in constant engagement with said pinion, and with cams which impart the endwise movement to the shaft to alternately throw it in and out of engagement with said pinion.

29. The combination of the tube formed with the cyclindrical chamber having the curved and straight grooves, transverse partitions inclosing a discoid chamber communicating with said grooves and the front conical chamber with the rotating shaft passing longitudinally through said tube, the fingers pivoted to the end of the shaft and to one end of a rod playing in the shaft, the key-piece attached to the other end of said rod, moving in a slot in the shaft and taking into the grooves in the tube, the spring pressing forward said key-piece, the pinion to rotate the shaft, and the lever and cam to retract and project the shaft and unclutch it from its pinion.

30. The combination, with the binding mechanism, of a regulating device, intermediate between it and the drive-wheel of the reaper, adjustable to determine the intervals of operation of said binding mechanism, and means whereby it is set for action by the return movement of the binding-arm to receive a fresh gavel.

31. The combination, with the binding mechanism and the rake delivering grain directly thereto, of a regulating device, adjustable to determine the intervals of operation of said rake and binding mechanism, and means whereby it is set for action by the return movement of the binding-arm to receive a fresh gavel.

32. The combination of the pulley running loose upon its shaft, the pawl upon said pulley, a shoulder or stop upon the shaft, against which said pawl takes to lock the pulley to the shaft, and the segment arranged to mesh with and depress the heel of said pawl to prevent its engagement with the shoulder.

33. The combination of the pulley running loose upon its shaft, the pawl upon said pulley, a shoulder or stop upon the shaft, against which said pawl takes to lock the pulley to the shaft, the segment arranged to mesh with and depress the heel of said pawl to prevent its engagement, and means for adjusting the segment to bring more or less of its teeth into action.

34. The combination of the pulley running loose upon its shaft, the pawl upon said pulley, a shoulder or stop upon the shaft, against which the pawl takes to lock the pulley to the shaft, the segment arranged to mesh with and depress the heel of said pawl to prevent its engagement, the cranked shaft and connecting-rod, connecting the segment with the compressing and binding arms for returning the segment to position, and the adjustable plate, whereby the segment is stopped at a point bringing more or less of its teeth into action.

35. The combination, with the knotter and with the cutter, of a single gear and cam wheel, whereby the rotary and endwise motion is given to the parts of the knotter and the cutter actuated to receive and sever the cord.

36. The combination, with the band-securing and band-cutting mechanism, and with the binding-arm, of a single gear and cam wheel intermediate between and operating the three.

37. The combination, with the rake, binding-arm, band-securing mechanism, and band-cutting mechanism, of an intermediate single gear and cam wheel driven from the reaper, whereby they are actuated and timed relatively to each other.

38. The combination, with the knotter, and with the cutter and stripper, of a single gear and cam wheel, whereby the knotter is actuated to lay the knot, the cutter to sever the ends of the cord, and the stripper to push the loop from the looping-surface of the knotter, substantially as described.

39. The gear and cam wheel formed, substantially as described, with a series of gear-teeth to receive motion from the driver, a series of gear-teeth to impart rotary motion to the rake and knotter, cams on one face to drive the binding-arm and cutter, and cams on the other face to cause endwise movement of the knotting-shaft, substantially as described.

40. The combination of the dog $n$, by which the end of the twine is held, with the hook $n'$, over which said twine is passed to reach the dog.

41. A binding-arm provided with a hook at its point, over and under which the twine is led, in combination with a dog pivoted to said binding-arm in position to clamp the end of the twine as it is brought from the hook.

42. In combination with the vibrating binding-arm, a dog pivoted near its point to hold the end of the cord, and a switch mounted upon the frame, up which a projection upon the heel of the dog rides as the arm closes, whereby the dog is tripped or operated to release the cord, and beneath which the projection passes as the arm recedes, that the dog may hold the new end fast.

43. The rake C, constructed as described, in combination with the endless chain by which it is driven, the guide-rail B, the foot-plate $c$, the block D, pin $e$, and guide E, or their equivalent devices, the whole arranged and operating substantially as herein set forth and specified.

44. In combination with the binding-arm and the pivoted cord-holding dog thereon, the cap Q′, provided with a guide-eye $q$, and flange $q^2$, with its pawl or switch, substantially as and for the purposes set forth.

45. The combination of the knife $r'$, forked plate $r$, connecting-links and levers $r^2$, $r^3$, $r^4$, and B′, and cam-flanges $g^2 g^3$, all arranged and operating substantially as set forth.

46. In combination with the knotter, a cutter and a stripper and tightener actuated simultaneously.

47. In combination with the knotter, a cutter and a stripper and tightener moved simultaneously by a single actuating-arm common to both.

48. In combination with the stripping and tightening arm $p^2$, the pivoted lever B′, connected therewith at one end, and at its other taking into the cam-track on the driven wheel.

49. The combination of the knife $r'$, the stripping and tightening arm $p^2$, the pivoted lever B′, connected with both, and the cam-track on the driven wheel, into which the heel of said lever takes.

J. B. GREENHUT.

Witnesses:
LOUIS FURST,
W. W. HAMILTON.